June 19, 1951

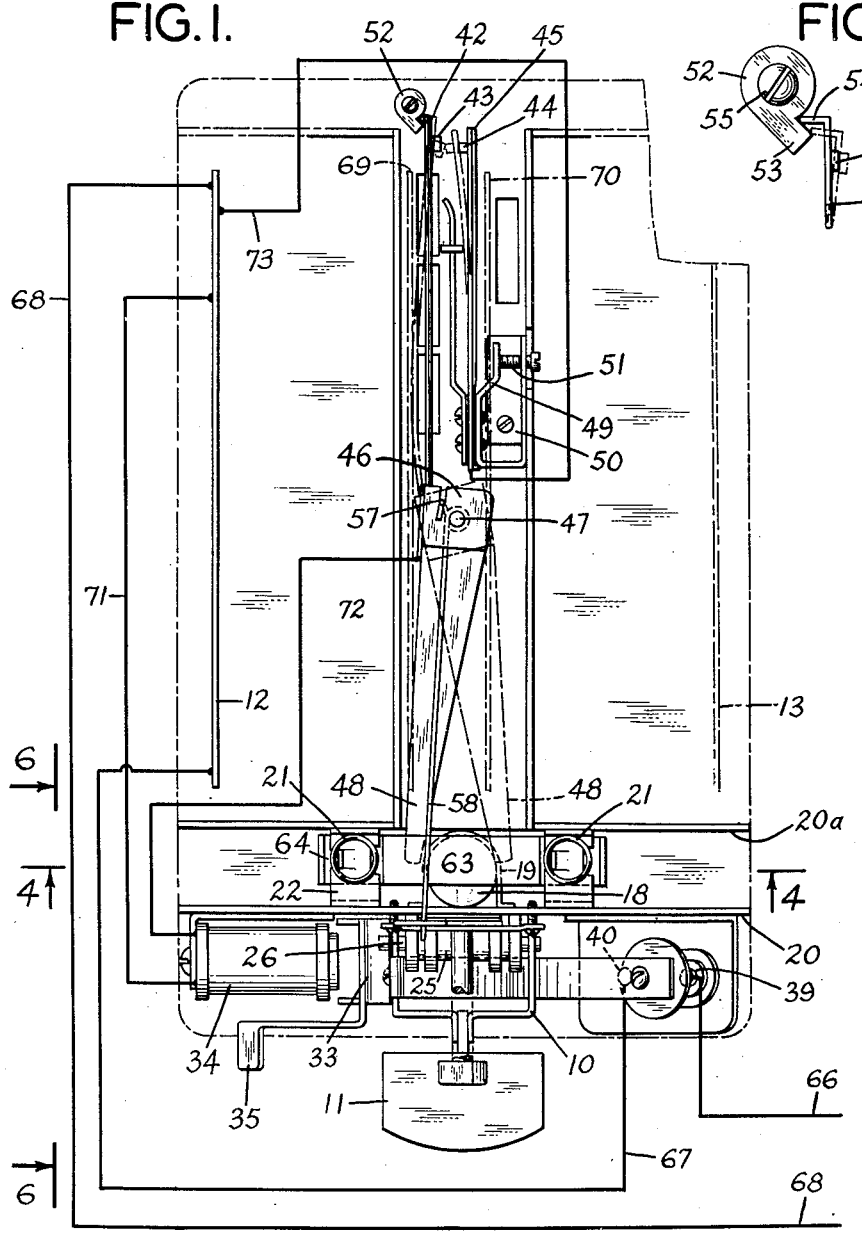

L. E. PADELFORD 2,557,512

ELECTRIC TOASTER

Filed Jan. 7, 1948

INVENTOR.
LESTER E. PADELFORD
BY
Philip S. McLean
ATTORNEY.

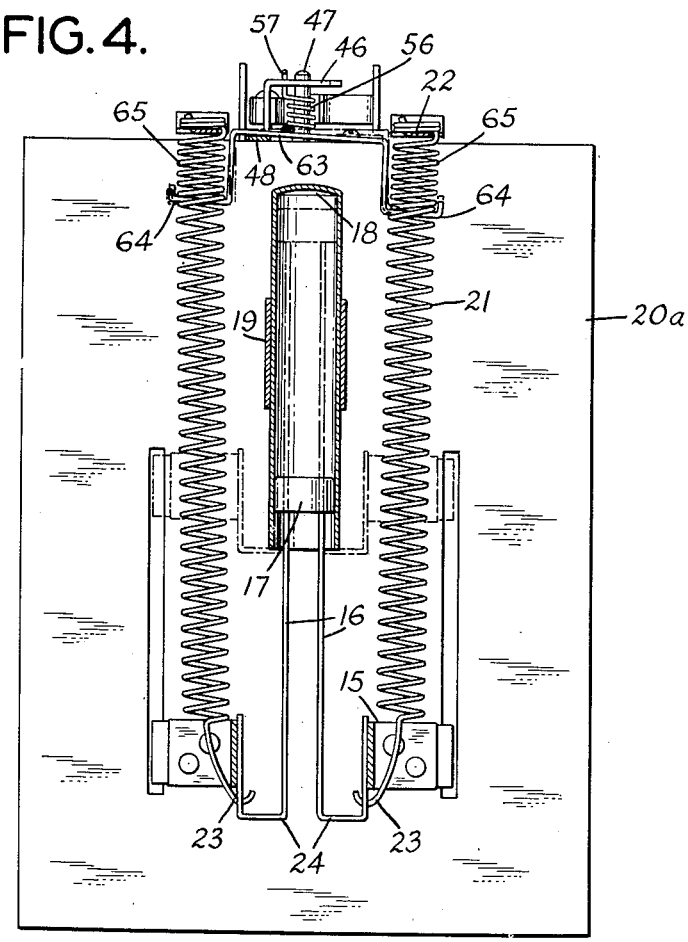

June 19, 1951  L. E. PADELFORD  2,557,512
ELECTRIC TOASTER
Filed Jan. 7, 1948  4 Sheets-Sheet 4
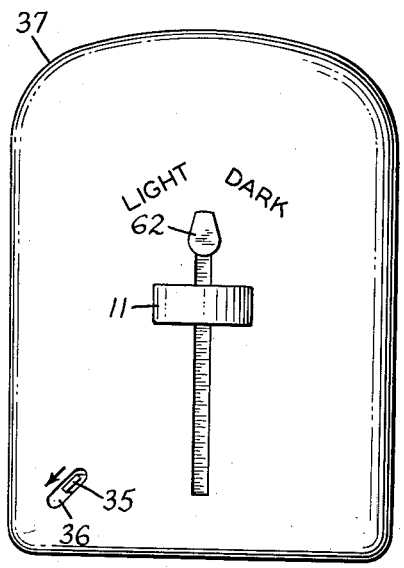
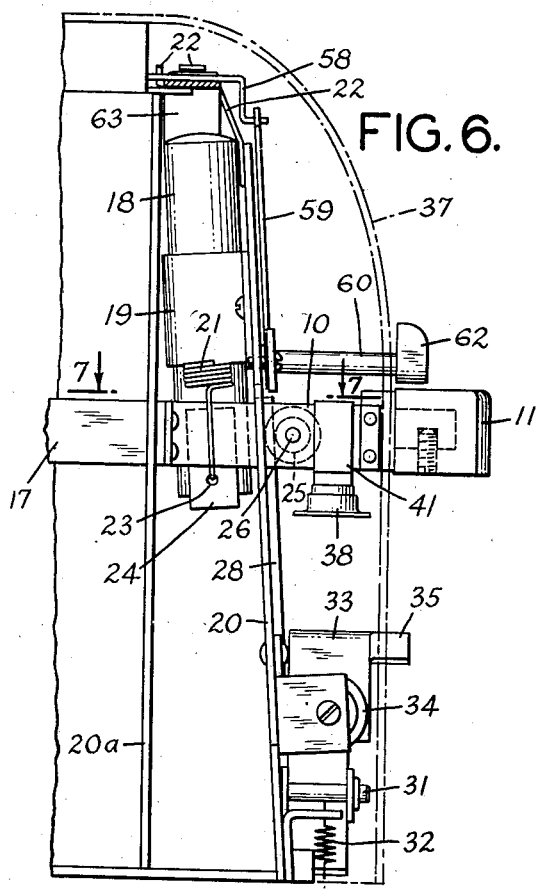
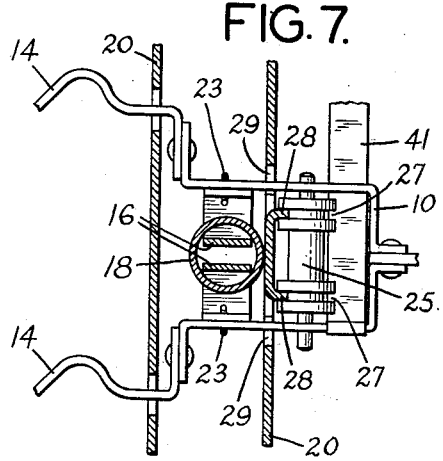
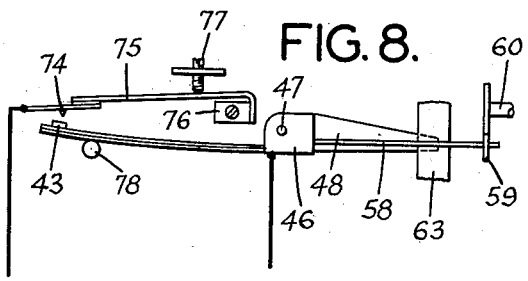
INVENTOR.
LESTER E. PADELFORD
BY
ATTORNEY.

Patented June 19, 1951

2,557,512

UNITED STATES PATENT OFFICE 2,557,512

ELECTRIC TOASTER

Lester E. Padelford, North Arlington, N. J.

Application January 7, 1948, Serial No. 858

2 Claims. (Cl. 99—329)

The invention here disclosed relates to electric toasters and particularly to those of the automatic type.

Special objects of the invention are to provide improved thermal timing means, the improvements being directed toward greater simplicity, lower costs, more uniform operation and general reliability.

Important objects of the invention also are to improve mechanical structure, particularly as regards the carrier for the toast and means for controlling the same, holding it in the toasting position and guiding and checking it in the toast delivering movement.

Other special objects of the invention are to provide improved switch mechanism for the toaster circuit which will assure firm and positive closing of the main heating circuit and quick acting, wide opening breaking of this circuit.

Further objects of the invention are to provide simple and direct acting latch trip mechanism for holding and releasing the toast carrier.

Other desirable objects attained by the invention are set forth or will appear in the course of the following specification. The drawings accompanying and forming part of the specification illustrate certain present preferred embodiments of the invention. Actual structure, however, may be modified and changed as regards the immediate illustration, all within the true intent and broad scope of the invention as hereinafter defined and claimed.

Fig. 1 in the drawings is a plan and somewhat diagrammatic view of essential portions of the toaster embodying the invention, with lines indicating necessary wiring connections;

Fig. 2 is an enlarged broken detail view of the adjustable back-stop for the timer bimetal;

Fig. 4 is a vertical sectional view with parts appearing as on substantially the plane of line 4—4 of Fig. 1;

Fig. 5 is an end elevation of the complete apparatus, with the external casing in place;

Fig. 6 is a broken side elevation showing portions of the internal mechanism as on substantially the plane of line 6—6 of Fig. 1;

Fig. 7 is a broken plan view of the bread carrier;

Fig. 8 is a broken plan view of a modified form of the thermal timer structure.

Figure 3:
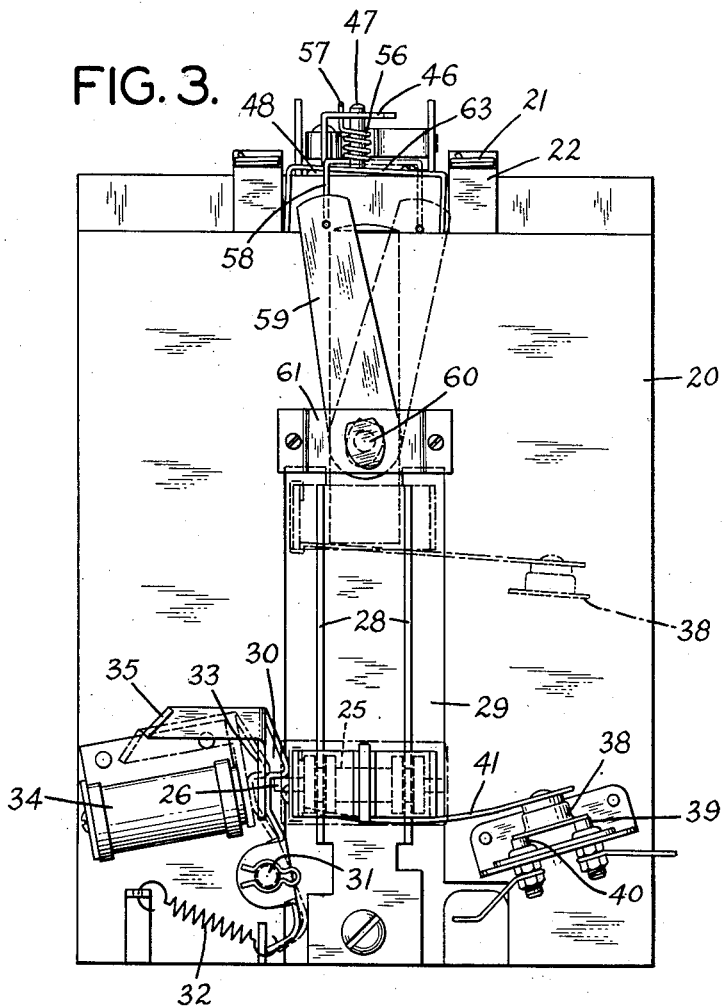
Fig. 3 is an end view of the mechanism as seen from the lower end of Fig. 1.

The machine illustrated comprises a carriage 10 which can be lowered by pressing down on the handle 11 to locate two slices of bread between heating grids, two of which are indicated at 12, 13, in Fig. 1.

The bread carriage is shown as made up of corrugated slice supporting bars 14 projecting from the spaced handle carrying bars 15 into the vertical toasting chambers or compartments between the grids.

The carriage 10 is guided and controlled in its vertical movements through the provision of vertically extending bars 16 attached to the handle forming bars 15 and carrying at their upper ends a piston 17 operating in an air cylinder 18 held in a surrounding bracket 19 attached to the end wall or frame plate 20, spaced outwardly of the inner wall 20a.

Helical springs 21 suspended from brackets 22 at the upper end of the frame plate 12 are connected at their lower ends at 23 with the downwardly looped portions 24 at the lower ends of the piston bars 16.

A roller 25 journaled by a stud 26 between the spaced side portions of the bars 15 rides over the outer face of the frame plate 20 and this roller is shown as being annularly grooved at 27 to engage over the out-struck flange or track portions 28 of the plate to guide the carrier laterally and hold it to a straight up-and-down motion. These tracks or guide flanges are shown provided at the inner edges of the vertical slots 29 in the frame plate, through which the side bars of the carrier project.

The bread carrier is caught and held in its lowered position by a hook form of latch shown at 30, Fig. 3, pivoted at 31 and arranged to catch over the projecting portion of the pivot stud 26 at that end of the guide roll 25.

This retainer latch is shown tensioned by spring 32 into position for holding engagement with the projecting stud 26 and as having a magnetic armature portion 33 to be attracted by the electromagnet 34.

Also, the retainer latch 30 is shown as having a handle extension 35 projecting out through a slot 36 in the end wall of the casing 37, in position for convenient actuation by a finger for releasing the carrier at any time.

The main heating circuit is controlled in the present disclosure by a cupped contact disc 38, Fig. 3, arranged to bridge two fixed circuit terminals 39, 40, and supported in insulated relation at the end of a spring arm 41 projecting from one side of the carrier frame.

The resiliency of this arm assures firm, self-adjusting engagement of the contact disc with the fixed terminals and a quick breaking of the circuit when the carrier is released. The fixed terminals 39, 40, are shown set on an incline so as to enforce a bending moment in the spring supporting arm as the contact disc comes into engagement with the fixed contacts.

The dotted lines indicate, in Fig. 3, that in the lowering movement of the carrier the disc 38 will engage first the outer switch contact 39 and then be tipped under increasing spring pressure into engagement with the inner and lower switch contact 40. This spring arm of the switch also assists to some extent the upward spring return movement of the carrier, and in the final upper position holds the bridging contact in a position widely separated from the fixed switch contacts.

The thermal timer portion of the apparatus is shown in Fig. 1 as made up of a thermostatic bar 42 carrying a contact 43 cooperable with a contact 44 on a second thermostatic bar 45.

The first thermostat or bimetal 42 is shown carried by and projecting from a bracket-like form of support 46 pivoted at 47 and having a projecting leverage portion 48 which may be clamped to hold this element in different positions of adjustment.

The second bimetal 45 is shown carried by the upstanding yielding arm 49 of a fixed supporting bracket 50 engaged by a set screw 51. By adjusting this set screw the second bimetal can be adjusted toward or away from the first or so-called "timer" bimetal.

The initial position of the pivotally mounted bimetal is determined by a back-stop 52, and this is shown as having an angularly extending arm 53 engageable by the angularly bent tip portion 54 of the bimetal. This stop is shown as secured in different positions of angular adjustment by a holding screw 55, this construction enabling the stop washer 52 to be secured with the lug 53 projecting toward the bimetal at different inclines and to different linear extent, thus to control the back or cold position of the bimetal and to some extent the curvature it will assume in the heating portion of the cycle.

The pivoted bimetal 42 is yieldingly tensioned toward the back-stop 52 by a spring 56, Fig. 3, coiled about the pivot stud 47 and having one end caught to the swinging bracket 46 at 57 and the other end extended at 58 to the lever 59 carried by the rocket shaft 60 pivoted in supporting bracket 61 and provided at the outside of the shell with a suitable indicating and operating knob or handle 62.

By turning the "Light" and "Dark" control button 62 one way or the other, the tension of the timer bimetal 42 against the back-stop 52 may be varied to cause it to take a shorter or a longer time to carry its contact 43 into engagement with the contact 44 of the fixedly mounted bimetal 45. As the latter becomes heated through successive use of the apparatus, this thermostat will bend toward the timer thermostat, as indicated in the broken lines, Fig. 1, automatically reducing the toasting time as required to produce substantially uniform toasting results.

The timer bimetal 42 as it heats up through repeated toasting cycles, bends, as shown in Fig. 2, to ride the angled lug 54 at the end of the same up the inclined stop lug 53, thus to carry contact 43 closer to contact 44 for automatically shortening the heating period.

The timer bimetal 42 as it heats up and bends into the bowed condition indicated in broken lines, Fig. 1, permits the supporting bracket 46 to swing on the pivot stud 47 and thus carry the leverage extension 48 of the same into different positions, such as indicated in the broken lines.

A special feature of the invention resides in catching and holding this leverage extension at the position it may then occupy at the beginning of each heating cycle so as to automatically start the timer in the position it should occupy for the heated condtiion of the parts existing as at that moment.

The holding means for such purpose comprises, in the disclosure, a yoke shaped strap 63, Fig. 4, arching over the top of the thermostat lever 48 and having its opposite ends carried down and caught in the coils of the springs at 64 a distance below the upper supported ends of these springs.

The result of this construction is that the convolutions of the springs at 65 above the points of attachment 64, will serve to lift the strap 63 off the lever 48 when the carriage is released and in its upper position.

When, however, the carriage is lowered and the springs 21 stretched downwardly as in Fig. 4, the upper convolutions 65 will pull the strap 63 downwardly as a clamp over the projecting end of lever 48, thus to automatically grip and hold the timer bimetal in the position at which it has left the lever standing from the last toasting cycle.

The yoke-like clamp 63 preferably is attached to the springs relatively close to the upper ends of the same to assure firm tensioning of the clamp bar over the bimetal lever as the springs are stretched downwardly for the full lowered position of the carriage.

The circuit connections may be generally approximately as indicated in Fig. 1, with an external circuit wire 66 extending to one switch terminal 39, a wire 67 extending from the other switch terminal 40 to one end of the heater grid 12 and a wire 68 extending back from the other side of the heater circuit to the other side of the line, it being understood that the other grids such as 13, and the two inside grids 69 and 70, are suitably connected in this heater circuit.

The magnet 26 is shown connected in a parallel circuit of reduced voltage by lines 71 and 72, the first being continued at 73 from a point of lowered potential on the grid to the fixed bimetal 45 and the other line, 72, directly connected to the timer bimetal 42.

Fig. 8 illustrates a modified and somewhat simpler form of the thermal timer, comprising only the single timer thermostat 42 arranged to have its contact 43 cooperate with a contact point 74 on a stiff metal plate 75 fixedly suppored at one end at 76 and tensioned toward the thermostatic bar by a set screw 77.

In this case the timer bimetal 42 rests against an insulating post 78 at the back of the same, positioned so that as it curves under repeated heating it will carry the contact 43 closer to the other contact 74.

With this construction, as in the case first described, the timer thermostat will be caught and held by the clamp 48 in position according to the extent to which it has been heated, and thus automatically set each time for the immediate heating cycle. Also, at the end of each toasting operation the clamp will automatically release the holding lever 48 of the bimetal, thus to permit the bimetal to automatically position itself as it cools in readiness for the next heating cycle.

The structure is particularly simple, consisting of relatively few parts, not likely to get out of order. And while consisting of but few, simple parts, the construction is strong and durable and reliable in operation.

In particular, the bread carrier is positively and firmly guided, by means of the piston and guide cylinder at one side of the upright supporting wall and the roller riding over the opposite side of this upright support. This roller assures free action and prevents any binding moments from pressure applied on the handle in forcing the carrier downward against the lifting tension of the springs. These springs are disposed at opposite sides of the guide cylinder and hence apply a balanced pull on the carrier in a plane lined up with the axis of the guide cylinder.

In addition to the guiding function, the piston and cylinder create an air cushion for slowing up and checking the spring movement of the bread carrier. This permits use of springs strong enough to effect a quick lifting action, assuring, however, that this action will be kept under proper control and slowed down at the end to prevent throwing out the toast.

While the invention is particularly related to the toasting of slices of bread, it will be appreciated that it may be used for other purposes and, accordingly, that the terms employed herein are to be considered in a descriptive rather than in a limiting sense, except, possibly, for such limitations as may be imposed by the state of the prior art.

What is claimed is:

1. A toaster of the character disclosed comprising a slice carrier having a handle for pushing it in one direction and a spring for projecting it in the opposite direction, a support for said carrier and reciprocably related piston and cylinder elements arranged to guide said carrier on said support and cooperating to compress a body of air for cushioning the spring impelled movements of said carrier, a latch for holding the carrier against the tension of said spring and means for effecting the release of said latch including an adjustably mounted thermostat and a clamp for temporarily holding said thermostat in fixed relation connected with said spring and tensioned thereby in holding engagement with said thermostat.

2. A toaster of the character disclosed comprising a slice carrier, a guide cylinder supported to guide the vertical lifting movements of said slice carrier, a piston connected with said slice carrier and operating in said cylinder to effect guidance and control of the upward movement of said slice carrier, lifting springs at opposite sides of said guide cylinder and connected at their lower ends with the carrier to effect the lifting movements of the same, a clamp bar connected with the upper ends of said lifting springs so as to be yieldingly lowered when said lifting springs are tensioned, a thermostatic unit for controlling release of the slice carrier, said thermostatic unit being supported for lateral shifting movements and having an extension projecting beneath said clamp bar and whereby said thermostatic unit will be clamped and held in the position it occupies when said springs are tensioned in the act of lowering the slice carrier for a toasting cycle.

LESTER E. PADELFORD.

REFERENCES CITED

The following references are of record in the file of this patent:

UNITED STATES PATENTS

| Number | Name | Date |
|---|---|---|
| 1,416,272 | Floriot | May 16, 1922 |
| 1,624,893 | Marsden | Apr. 12, 1927 |
| 1,984,063 | Graham | Dec. 11, 1934 |
| 2,052,927 | Hallwood | Sept. 1, 1936 |
| 2,141,867 | Ireland | Dec. 27, 1938 |
| 2,180,233 | Graham | Nov. 14, 1939 |
| 2,217,450 | Newell | Oct. 8, 1940 |
| 2,319,997 | Ireland | May 25, 1943 |
| 2,362,751 | Huck | Nov. 14, 1944 |
| 2,363,169 | Fischer | Nov. 21, 1944 |
| 2,389,927 | Parr | Nov. 27, 1945 |
| 2,431,195 | Olving | Nov. 18, 1947 |
| 2,436,735 | Walder et al. | Feb. 24, 1948 |
| 2,446,935 | Kreer | Aug. 10, 1948 |